US008480180B2

(12) United States Patent
Titz et al.

(10) Patent No.: US 8,480,180 B2
(45) Date of Patent: Jul. 9, 2013

(54) HEIGHT-ADJUSTABLE DEFLECTION DEVICE FOR A THREE-POINT BELT, VEHICLE SEAT WITH A THREE-POINT BELT AND METHOD FOR THE HEIGHT ADJUSTMENT OF THE UPPER FASTENING POINT OF A THREE-POINT BELT

(75) Inventors: Winfried Titz, Detmold (DE); Austin Jennings, Bielefeld (DE)

(73) Assignee: Isringhausen GmbH & Co. KG, Lemgo (DE)

( * ) Notice: Subject to any disclaimer, the term of this patent is extended or adjusted under 35 U.S.C. 154(b) by 0 days.

(21) Appl. No.: 12/927,822

(22) Filed: Nov. 23, 2010

(65) Prior Publication Data

US 2012/0248846 A1 Oct. 4, 2012

Related U.S. Application Data

(63) Continuation-in-part of application No. 12/815,303, filed on Jun. 14, 2010, now abandoned, which is a continuation of application No. 11/824,952, filed on Jul. 3, 2007, now Pat. No. 7,735,934, which is a continuation-in-part of application No. PCT/EP2006/000039, filed on Jan. 4, 2006.

(30) Foreign Application Priority Data

Jan. 4, 2005 (DE) .......................... 10 2005 000 736

(51) Int. Cl.
*B60R 22/00* (2006.01)

(52) U.S. Cl.
USPC .......................... 297/473; 297/483; 280/808

(58) Field of Classification Search
USPC .................................... 297/483, 473; 280/808
See application file for complete search history.

(56) References Cited

U.S. PATENT DOCUMENTS

| 5,599,070 A | * | 2/1997 | Pham et al. .................... 297/483 |
| 5,658,051 A | * | 8/1997 | Vega et al. ..................... 297/483 |
| 5,722,732 A | * | 3/1998 | Haldenwanger .............. 297/483 |
| 2008/0048483 A1 | | 2/2008 | Fuhrken et al. |

* cited by examiner

*Primary Examiner* — Milton Nelson, Jr.
(74) *Attorney, Agent, or Firm* — Abelman, Frayne & Schwab

(57) ABSTRACT

A height-adjustable deflection device that functions as the upper fastening point of a three-point safety belt which facilitates adjustment of the belt height and minimizes unintentional changes of the upper fastening point. The relative height of the upper fastening point of the belt is established by a slot formed in the device housing. In a locked position, the housing is engaged with a holder in a form-locking manner to securely establish the upper fastening point of the belt. In an adjustment position, engagement between the holder and the housing is prevented to enable free rotation of the housing about a swivel axle. The configuration of the housing geometry with respect to the swivel axle, the height of the outlet slot thereby changes during rotation of the housing. The relative height of the slot, i.e., the upper fastening point, can be readily established on an individual basis.

17 Claims, 5 Drawing Sheets

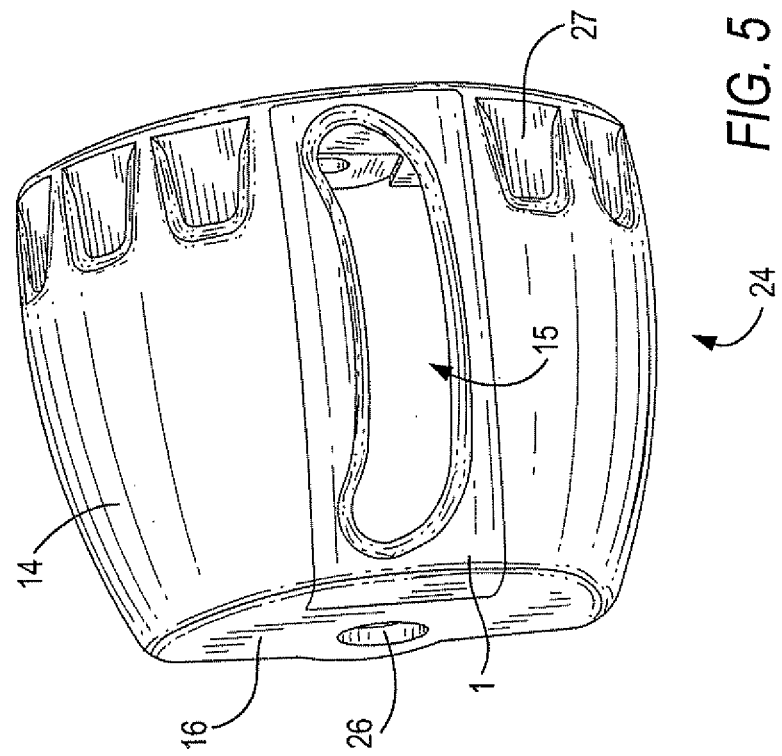
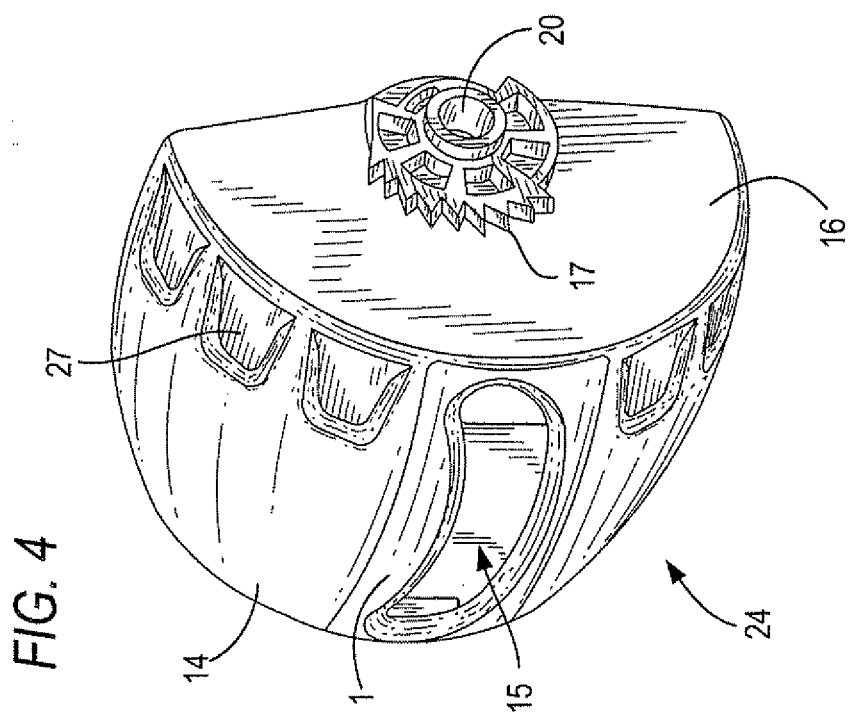

HEIGHT-ADJUSTABLE DEFLECTION DEVICE FOR A THREE-POINT BELT, VEHICLE SEAT WITH A THREE-POINT BELT AND METHOD FOR THE HEIGHT ADJUSTMENT OF THE UPPER FASTENING POINT OF A THREE-POINT BELT

CROSS REFERENCE TO RELATED APPLICATION

This patent application is a continuation-in-part of U.S. patent application Ser. No. 12/815,303, filed Jun. 14, 2010 (now abandoned), which is a continuation of U.S. patent application Ser. No. 11/824,952, filed Jul. 3, 2007 (now U.S. Pat. No. 7,735,934, issued Jun. 15, 2010), which is a continuation-in-part of and claims the benefit under 35 U.S.C. §371 to International Application No. PCT/EP2006/000039, filed on Jan. 4, 2006, which claims priority to German application no. DE102005000736.8, filed Jan. 4, 2005, the content of all of which are incorporated by reference in their entireties.

BACKGROUND

The invention relates to a height-adjustable deflection device for the upper fastening point of a three-point belt, a vehicle seat with such a height-adjustable deflection device and a method for the height adjustment of the upper fastening point of a three-point belt.

Commercial vehicle seats in particular are preferably equipped with pneumatically or mechanically sprung vibration-damping systems and thus protect the driver from vibrations of different frequency and amplitude which are unpleasant and harmful to health. A further safety element is the three-point belt. The stationary vehicle-side attachment of the third belt point e.g. to the B-column leads to a clear loss of comfort due to the relative movement between vehicle and seat or driver. Safety and comfort are offered by vehicle seats with a fully integrated three-point belt system, with a belt-end fitting arranged seat-side in the region of the pelvis and, opposite, a seat-belt lock, on the right in the direction of travel, for the driver's side. The shoulder belt outlet is integrated backrest-side and connected to the belt reel of an automatic belt system. A problem with three-point seat belts is that, in the case of a fixed upper fastening point, a sloping shoulder belt cannot operate optimally for different-sized individuals. In order to improve this effect it must therefore be possible for the height of the upper fastening point to be varied.

A height-adjustable deflection device for the upper fastening point of a three-point belt with a holder which can be attached to a supporting member of a vehicle seat is known from JP 2001-158327 A. A deflector which has a reel with a spindle, via which the belt strap of a three-point belt is guided is movably attached in the holder. Parallel to the spindle of the reel, a housing has an outlet slot for the belt strap. Connecting means are formed at the holder and at the deflector such that they engage in form-locking manner with one another in a locked position and do not engage with one another in an adjustment position. The deflector can thus be rotated about a spindle in the adjustment position. The holder has a connecting plate and two supporting brackets, in each of which an oblong hole is formed to receive the spindle of the deflector. However, such a device is not easy to operate and is also not easy to assemble because of the various parts needed.

From DE 35 30 495 A1 a device is known by means of which the height of the upper fastening point can be varied. For this purpose a guide slot running obliquely from top to bottom is formed on the backrest of the vehicle seat. It has a slot opening with a width approximately 3.5 times the width of the seat belt. This makes it possible for the upper fastening point to be located higher or lower depending on the size of the occupant. An improved effect of the three-point belt on the occupant is thereby achieved. However, the seat belt can unintentionally be moved up or down within the guide slot, with the result that the optimum height is not permanently guaranteed. Thus the better effect which is possible in principle may no longer come about under certain circumstances.

A belt retractor is known from U.S. Pat. No. 5,088,794 which has an outlet slot, the height of which can be varied, for the seat belt. The outlet slot is aligned horizontally in a cylindrical casing which is rotated about its central axis. The height of the outlet slot can thus be matched to the person on the vehicle seat. The position of the outlet slot is established via a mechanism in the form of a pivoting lever which is laterally attached to the cylindrical casing. The pivoting lever has a cam with which it engages in one of several recesses in a locking element connected to the cylindrical casing. The pivoting lever releases the cylindrical casing if the pivoting lever is rotated out of its locked position against a spring force by means of an adjusting wheel and thereby causes the cam to come out of the recess. After the cylindrical casing with the outlet slot has been rotated into the correct height, the adjusting wheel is released and the cam enters another recess, with the result that the height of the outlet slot is again fixed. This is a complicated device with many individual parts which must all engage in one another.

Finally, a device is known from EP 1 838 561 B1 by means of which the height of the upper fastening point can be adjusted. For this a deflector which has a reel with a spindle via which the belt strap can be guided, and a housing with an outlet slot for the belt strap, which is aligned parallel to the spindle of the reel is movably attached in a holder. First connecting means are formed at the holder and second connecting means at the deflector which engage in one another in form-locking manner in a locked position and do not engage in one another in an adjustment position, with the result that the deflector can be rotated about the spindle. The spindle of the deflector is pressed into the locked position by means of a spring and the holder has a connecting plate and two supporting brackets, in each of which an oblong hole is formed to receive the spindle of the deflector. The deflector and the reel have a single matching spindle. The height adjustment of the upper fastening point of the three-point belt can thereby be achieved by pressing the deflector backwards against a pressure, rotating it about the spindle and then releasing it again.

SUMMARY OF THE INVENTION

Apparatus embodiments of the invention are directed to height-adjustable deflection devices that function as the upper fastening point of a three-point safety belt, and that facilitate easy adjustment of the belt height and minimize unintentional changes of this upper fastening point. In various apparatus embodiments, the relative height of the upper fastening point of the three-point belt is established by an outlet slot formed in the device housing. When a device according to such invention embodiments is in a locked position, the housing is engaged with the holder in a form-locking manner via connecting means, thereby securely establishing the upper fastening point of the three-point belt. When such device is in an adjustment position, one series of embodiments prevents such engagement between the holder and the housing to permit free rotation of the housing about a swivel axle, while another series of embodiments comprises a freewheel to permit unidirectional rotation of the housing about a swivel axle. As a consequence of the housing geometry with respect to the swivel axle, the height of the outlet slot thereby changes during rotation of the housing. The relative height of the outlet slot, and hence of the upper fastening point, can thus be established very easily and on an individual basis.

If a freewheel is used, rotation against the freewheel is not possible in one direction. It is thus guaranteed that the upper fastening point, once set to the occupant's body size, cannot be inadvertently changed again. An optimum effect of the three-point belt on the occupant is thereby always guaranteed.

In addition to the foregoing, the height-adjustable deflection device according to the invention is also very simple as regards to structure and operation because the holder comprises a connecting plate and two supporting brackets, each of which defines an oblong hole for receiving a spindle of the housing or alternatively an axle bearing, and an axle bearing can also be formed at one supporting bracket and a hole at the other supporting bracket. Thus there is a very simple design for the movement of the swivel axle between the locked position and the adjustment position. Because the swivel axle of the housing is pressed into the locked position by means of a spring, in particular a spiral compression spring, there is an extremely simple and efficient possibility for holding the housing in its locked position if no adjustment is desired. When adjustment is desired, one need only overcome the spring bias. After adjustment and release of the housing, the housing then automatically returns to its locked position. By shifting the spindle backwards vis-à-vis the swivel axle of the housing, thus decoupling these two axles, the swivel axle of the housing can remain in almost the same position during rotation. Thus, upon rotation in a first direction, the housing is pressed backwards in a first direction against a restoration bias, rotated about the spindle, and is then released again. Furthermore, upon rotation in the opposite, second direction, is moved as in the case of a ratchet mechanism in the freewheel.

The various invention embodiments also include systems comprising the height-adjustable deflection device for the upper fastening point of a three-point belt and a vehicle seat. As used herein, a vehicle seat includes seats for motor vehicles (such as passenger and commercial motor vehicles), for aircraft, or other vehicles that require operator and/or passenger restraint, for example, amusement rides.

In certain embodiments of the invention, the first connecting means and the second connecting means comprise matched case gear tooth systems. This configuration results in a very simple design that permits easy disengagement from one another in order to move them into an adjustment position, and easily brought into form-locking engagement with one another in order to achieve a locked position.

In certain other invention embodiments, the gear tooth system is formed according to the principle of a freewheel in a rotation direction of the housing. Upon a rotation in the one direction, the housing need not be actively moved backwards in order to disengage the gear tooth system. This leads to an increase in operator comfort. Preferably the device is formed such that this freewheel principle exists for the upward movement of the outlet slot.

In yet other embodiments of the invention, the first and second connecting means are formed only on one side of the deflection device. The housing and the adjacent parts can thereby be formed in less complex manner.

In still other invention embodiments, the swivel axle may be formed as a fixed bearing in its first bearing in the holder and as a floating bearing in its second bearing. A simplified, advantageous bearing situation is thereby achieved. By a fixed bearing, it is meant a bearing whose position cannot be changed, and which allows only small deviations in the alignment of the swivel axle. By a floating bearing, on the other hand, it is meant a bearing that is intentionally movable in relation to the two components connected to one another, with the result that the swivel axle—when a floating bearing formed at both ends—can carry out a parallel movement.

A further advantageous development of the invention provides that the basic form of the housing has a frustum-shaped casing surface, formed concentrically about the swivel axle. As the outlet slot for the three-point belt which defines the upper fastening point is located on a frustum-shaped casing surface—this is preferably formed rounded in the direction of the swivel axle—the horizontal position of the outlet slot is also changed in the case of a vertical movement due to the rotary movement and its arrangement on the frustum-shaped casing surface. The upper fastening point is thereby advantageously further forward in the case of large occupants than in the case of small occupants, which has proved particularly favourable. Moreover, the frustum shape has a positive influence on the run of the belt, as this already leaves the housing in the correct direction, thus onto the belt closure.

A further advantageous development of the invention provides that handle recesses are formed at the end of the housing with the larger diameter. User-friendliness is thereby improved vis-à-vis a central operation of the housing. In particular operator comfort is clearly better in the top position of the outlet slot as, during setting, it is no longer necessary to press on the belt strap itself, but the ergonomically shaped handle recesses can be used.

A further advantageous development of the invention provides that the reel comprises a belt retractor. Two parts are thereby integrated in one. It is thus no longer necessary to attach a belt retractor at another point in addition to the reel. This is very advantageous in the case of height-adjustable deflection devices which are integrated into the vehicle seat, as space is thus saved within the vehicle seat.

A further advantageous development of the invention provides that the height-adjustable deflection device is arranged in the vehicle seat and the housing is partly covered by a panel. In the case of a deflection device integrated in the vehicle seat, on the one hand a good aesthetic effect is produced and on the other hand unintentional pinching or other injury cannot occur when adjusting the deflection device.

A further advantageous development of the invention provides that the swivel axle is formed in one piece with the housing at least at one bearing point. The whole housing can thereby be constructed in a single piece.

A further advantageous development of the invention provides that, at least in the region of one of its two ends, the swivel axle has a suitable form lock, e.g. a groove, a bore or a slot, in which the free end of the spring is guided. The result is that the spindle is captive in axial direction.

A further advantageous development of the invention provides that the reel is formed convex. The belt strap is thereby well centred on the reel.

A further advantageous development of the invention provides that the bearings of the reel are crowned. A reduction in friction and an improved wear resistance compared with cylindrical bearings thus results, so that an improved running smoothness and longer operating life result.

A further advantageous development of the invention provides that the region around the outlet slot is formed as a fitting which can be detached from the housing. Freedoms both in the choice of material and also in the design, for example as regards colour and surface graining, are thereby achieved. The belt outlet slot can also be easily replaced and thus very easily matched to the specific user needs of the occupant. Changes can also be made easily and quickly between different outlet slot geometries with the same basic body of the housing.

A further advantageous development of the invention provides that the outlet slot and the spindle in its central region both run horizontally, and the outlet slot is bent upwards in both its edge regions. All entry and exit angles of the belt strap that are relevant for the application case can be realized by the geometry without swivelable parts. Thus an ordered engage and release behaviour results, with the result that the belt strap is prevented from unfolding when engaging which would lead to the engagement process being impeded. Moreover the friction between the outlet slot and the belt strap is reduced.

BRIEF DESCRIPTION OF THE DRAWINGS

Further advantages and details of the invention are described below with reference to the embodiment example represented in the figures. There are shown in detail.

DESCRIPTION OF THE EMBODIMENTS

Figure 1:
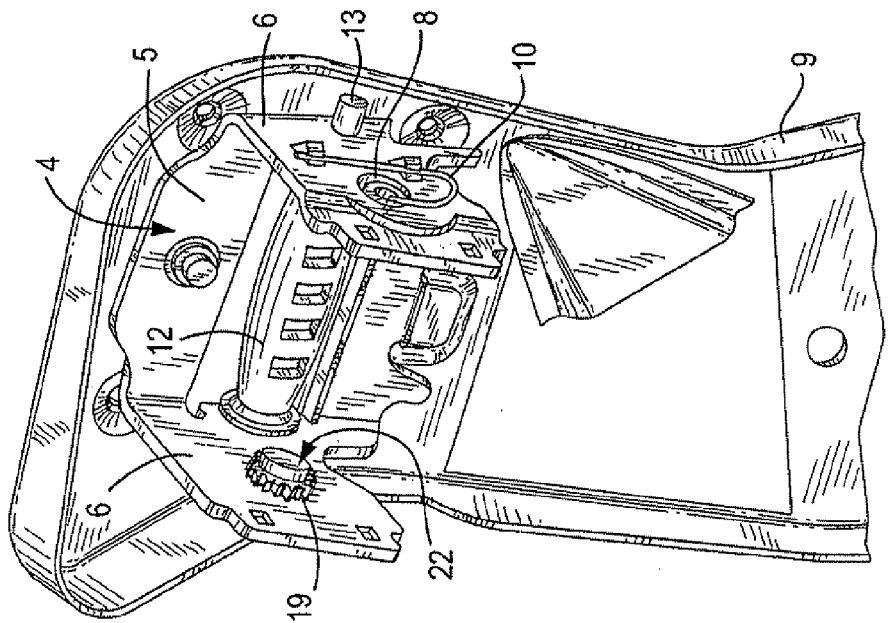
FIG. 1 a perspective view of an embodiment example of a height-adjustable deflection device according to the invention, FIG. 2 the deflection device from FIG. 1 from a different perspective without the housing, FIG. 3 the deflection device from FIG. 1 in a cross-section, FIG. 4 a perspective, enlarged view of the housing from FIGS. 1 and 3, FIG. 5 a front view of the housing according to FIG. 4, FIG. 6 an enlarged front view of the fitting according to FIGS. 1 and 3-5, FIG. 7 a perspective view of a height-adjustable deflection device on a backrest frame and FIG. 8 the deflection device from FIG. 1 in the direction of view of FIG. 3, without the cross-section.

FIG. 1 shows a perspective view of a deflection device according to the invention, by means of which the height of the upper fastening point 23 of a three-point belt can be changed. The deflection device according to the invention has four components whose cooperation brings with it the advantages according to the invention: a holder 4, a housing 24, a spring 10 arranged between these two and a reel 12.

In the embodiment example represented, the holder 4 and thus the whole deflection device according to the invention is fixedly connected to a supporting member 9 of a vehicle seat (not shown) via a connecting plate 5. Here all known connection methods are possible, for example welding, riveting or screwing. Beside the arrangement shown within the vehicle seat—for example in its backrest within the upholstery—the deflection device according to the invention can equally be attached directly to the framework of the vehicle in which the vehicle seat is located. This corresponds to the possible ways in which the known upper fastening points 23 have already been attached in vehicle up until now.

The assembly of the represented holder 4, in addition to the connecting plate 5, also has two supporting brackets 6 attached thereto which are arranged parallel at a distance from one another. First connecting means 7 (See FIG. 8) are formed in these supporting brackets 6. These first connecting means 7 are in the form of a gear tooth system. They are formed only on one of the two supporting brackets 6. On the other hand it is necessary for a bearing 19, 20 to be present in each of the two opposite supporting brackets 6 in each case.

The assembly of the housing 24 is housed as floating bearing in an oblong hole 8 by the second bearing 20 (see in particular FIG. 4) formed at one of the side faces 16 on the one side in the holder 4. For this, the hole 8 in the holder 4 is larger than the second bearing 20 at the housing 24. On the opposite side the housing 24 has an opening 26 which is arranged rotatable virtually play-free as a fixed bearing on the first bearing 19 of the holder 4. The housing 24 thus has a swivel axle 11 which is formed by the two bearings 19, 20. A casing surface 14 which has the form of a rounded frustum is formed concentrically around this swivel axle 11. This can be seen best in FIG. 5. Handle recesses 27 which make possible a better grasping and operation of the casing surface 14 are formed in the edge region of the casing surface with the larger diameter. Within the casing surface 14 an outlet slot 15 is formed. The belt strap of a three-point belt (both not shown), which is guided over the reel 12 within the deflector, runs through this outlet slot 15.

A connecting means, which is formed by a first connecting means 7 that selectively interfaces and engages with a second connecting means 17, is provided on the side face 16 of the housing 24, e.g., the larger diameter side face of the frustrum-shaped housing. The second connecting means 17 is matched to the first connecting means 7 on the supporting bracket 6 of the holder 4. In the case shown this is a gear rim which has teeth with different tooth flank angles, wherein the back of the tooth displays an angle without self-locking and the front of the tooth has one with self-locking, with the result that, when cooperating with the first connecting means 7 at the holder 4 with the inverted gear tooth system a ratchet mechanism with coordinated locking and free-running action results at the supporting brackets 6. In principle it is also possible for second connecting means 17 and respectively opposing first connecting means 7 to be arranged on both side faces 16, but it is preferred that these are formed on only one side face 16.

A spring 10, in the form of a spiral spring, is fixedly attached to the connecting plate 5 of the holder 4. The attachment can take place in force- or form-locking manner. In the region of its free end 28, the spring 10 pushes the swivel axle 11 of the housing 24 forward inside the oblong hole 8 (to the left in FIG. 1). This means that the second connecting means 17 of the housing 24 are engaged with the first connecting means 7 of the holder 4. The deflector is thus located in a locked position, as the swivel axle 11 and thus the casing surface 14 with the outlet slot 15 cannot be rotated. The upper fastening point 23 of the three-point belt is thus secured in this locked position and cannot be changed by pulling the three-point belt downwards or forwards. However, in the shown embodiment example an upwards rotation of the housing 24 is also possible in this locked position because of the ratchet mechanism. As the second bearing 20 can move within the oblong hole 8 against the force of the spring 10, the teeth of the two connecting means 7, 17 can be disengaged by pressing the housing 24 against the spring force in the direction of the connecting plate 5 of the holder 4. In this position the housing can also be moved against the direction in which the gear tooth system acts as a ratchet mechanism. In the shown embodiment example this is downwards when the outlet slot 15 is moving.

The free end 28 of the spring 10 engages in a recess at the end of the second bearing 20. The swivel axle 11 is thus prevented from being able to be moved in axial direction. In the shown embodiment example the second bearing 20 and the housing 24 are formed in one piece. Any other versions of the spring 10 and of the swivel axle 11 which allow cooperation between these two parts are equally possible, wherein the swivel axle 11 can rotate but still cannot be moved in axial direction and is at the same time pushed forwards within the oblong hole 8.

Figure 7:
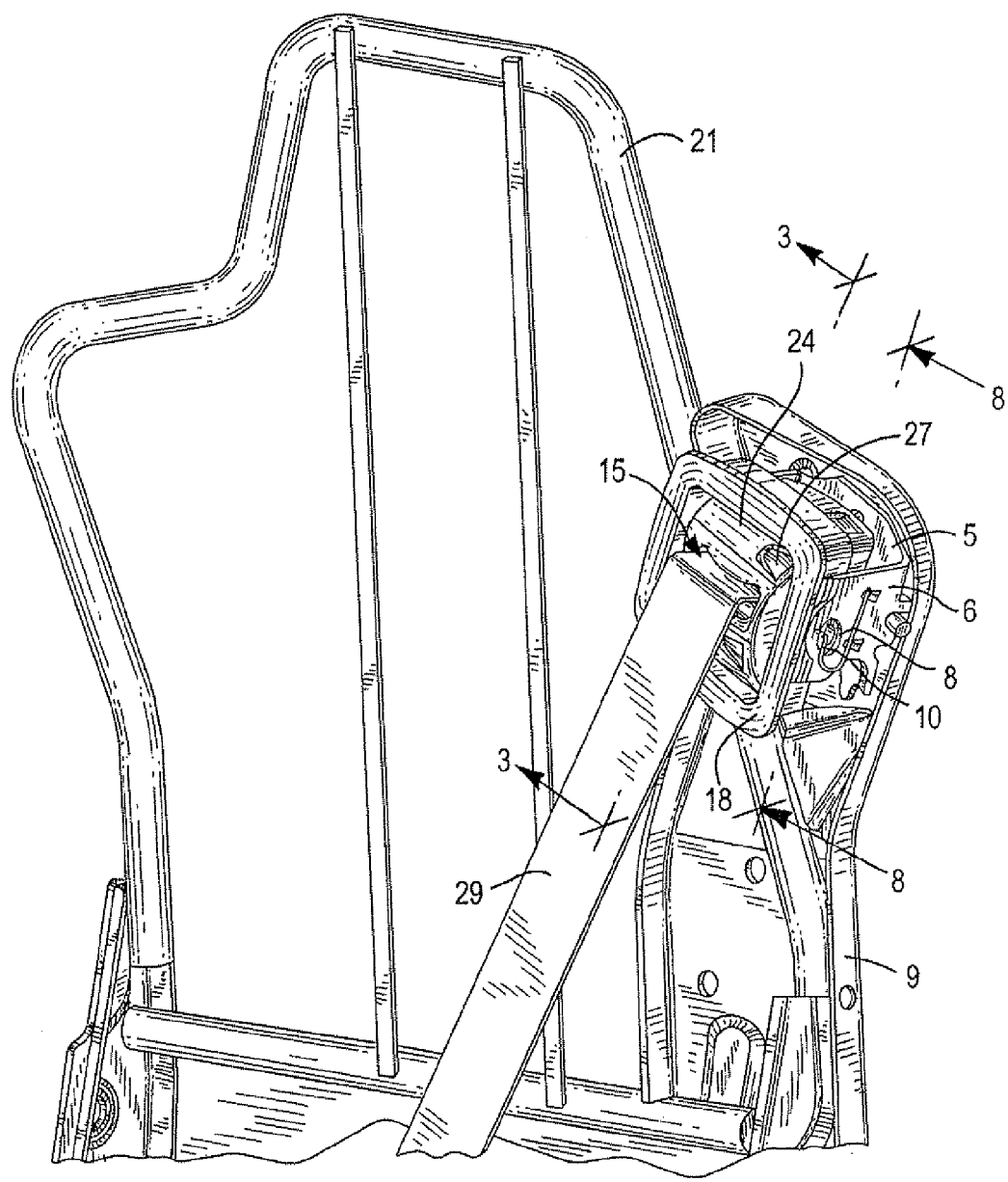
Figure 8:
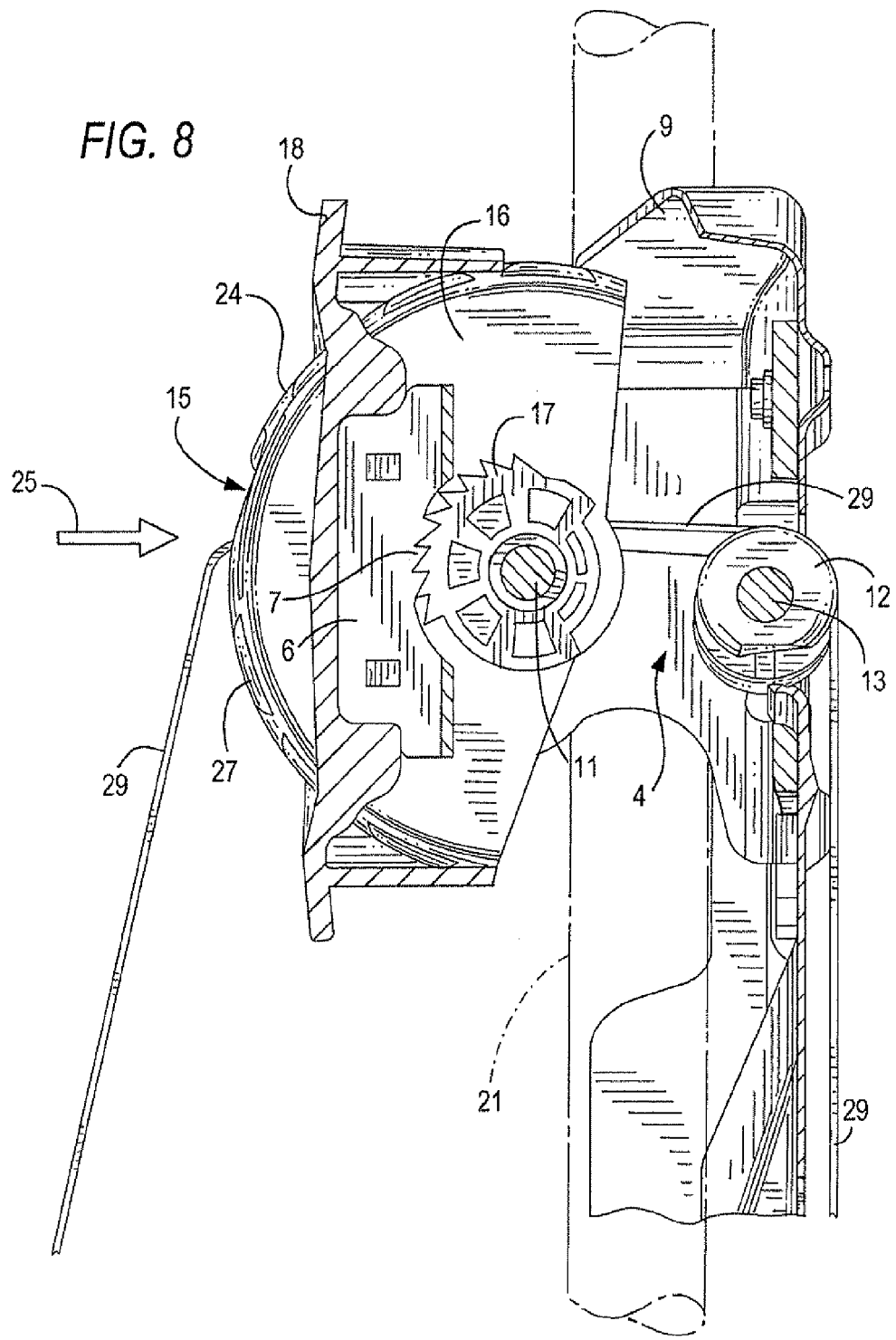

The deflection device is located behind a panel 18, see FIGS. 7 and 8, over which it partly projects with its casing surface 14. An aesthetically attractive closure between the deflection device and the upholstery of the backrest is thereby achieved. In addition an occupant cannot inadvertently sustain an injury by unintentionally inserting his hand into the deflection device. The deflection device is in fact completely enclosed by the panel 18.

The adjustment position is achieved by exerting pressure 25 in the direction of the double arrow on the housing 24 via its casing surface 14, in particular via the handle recesses 27. The swivel axle 11 is thus moved against the spring force of the spring 10 about a release path such that it changes alignment, as it is stored at the left-hand end in a fixed bearing. The first connecting means 7 of the supporting brackets 6 are no longer engaged with the second connecting means 17 of the side faces 16 of the housing 24. It is thereby possible to also rotate the housing 24 downwards about the swivel axle 11 towards the ratchet mechanism. The outlet slot 15 can then be rotated into the optimum height for the occupant on the vehicle seat.

Once the desired height of the outlet slot 15 is reached, the pressure 25 on the casing surface 14 of the housing 24 is removed, with the result that the spring 10 again pushes the swivel axle 11 to the left within the oblong hole 8 and the second connecting means 17 of the side face 16 of the housing 24 again engage with the first connecting means 7 on the supporting brackets 6 of the holder 4. In this position which, apart from the height of the outlet slot 15 and thus of the upper fastening point 23, corresponds to that in FIG. 1, the housing 24 is again in its locked position, with the result that it can no longer be rotated about the swivel axle 11. The upper fastening point 23 is thus also securely fixed in this position, with no possibility of it being inadvertently changed.

It is self-evident that any locked positions between the lowest upper fastening point 23 and the highest upper fastening point 23 can be obtained. For this purpose it is merely necessary for the first connecting means 7 to be able to be brought to engage with the second connecting means 17 in the desired position. How great the distances are between two adjacent points for the upper fastening point 23 therefore depends on the fineness of the respective first connecting means 7 and the respective second connecting means 17.

As the outlet slot 15 is located on a frustum-shaped casing surface 14, the upper fastening point 23 does not move along a vertical straight line but on a circular path about the swivel axle 13. A horizontal relative path is thus obtained, which depends on the height of the chosen upper fastening point 23. This means that, in the case of smaller occupants, the upper fastening point 23 is located further back (right in the diagram) and in the case of larger occupants further forwards. This is advantageous for the optimum operation of the three-point belt.

Figure 2:
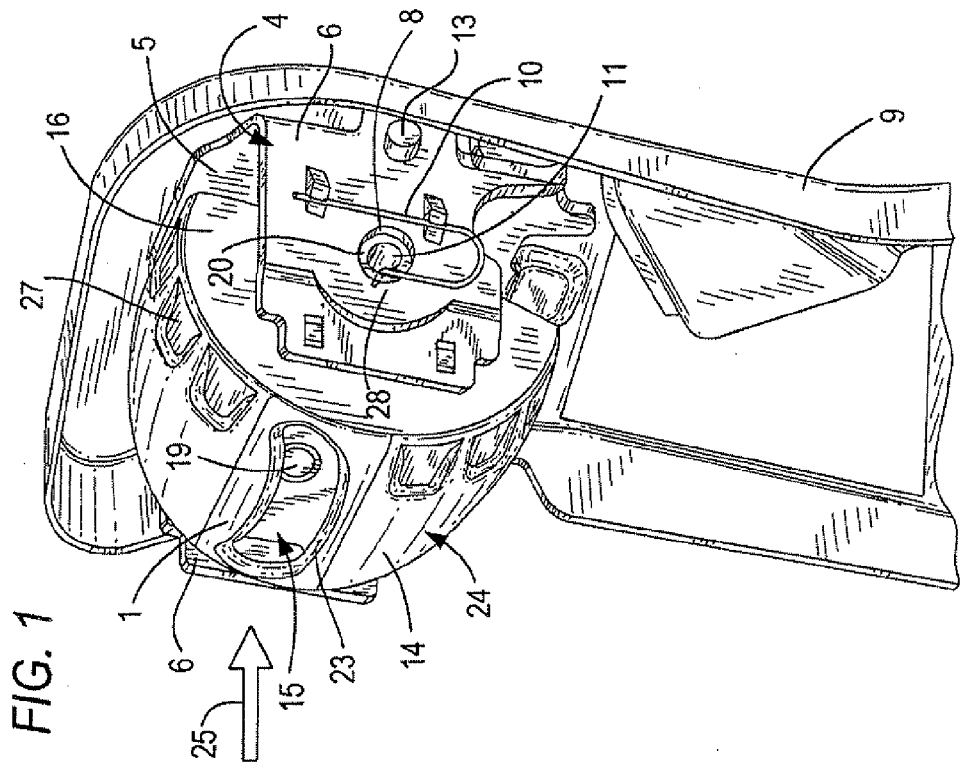

In FIG. 2, the housing 24 shown in FIG. 1 is removed in order to be able to better recognize the features concealed beneath it. These are essentially the first bearing 19 and the reel 12.

The first bearing 19 is in the form of a fixed bearing with a bearing hole 22, with the result that the opening 26 in the side face 16 of the housing 24 is pushed virtually play-free onto the first bearing on the side with the smaller diameter (see in particular FIG. 5). It has only just enough freedom of play that a small change in direction of the swivel axle 11 is possible; far enough to allow the second bearing 20 of the housing 24 to be moved into the oblong hole 8 of the supporting bracket 6 (see FIG. 4).

The reel 12 is mounted on the spindle 13 and formed convex, with the result that it has a smaller diameter at both its ends than in the centre. A better centring of the belt strap on the reel 12 and thus also in the outlet slot 15 is thereby achieved. To reduce wear on the reel 12 upon rotation when the belt strap is engaged or released, the bearings of the reel 12 are formed crowned (not visible).

Figure 3:
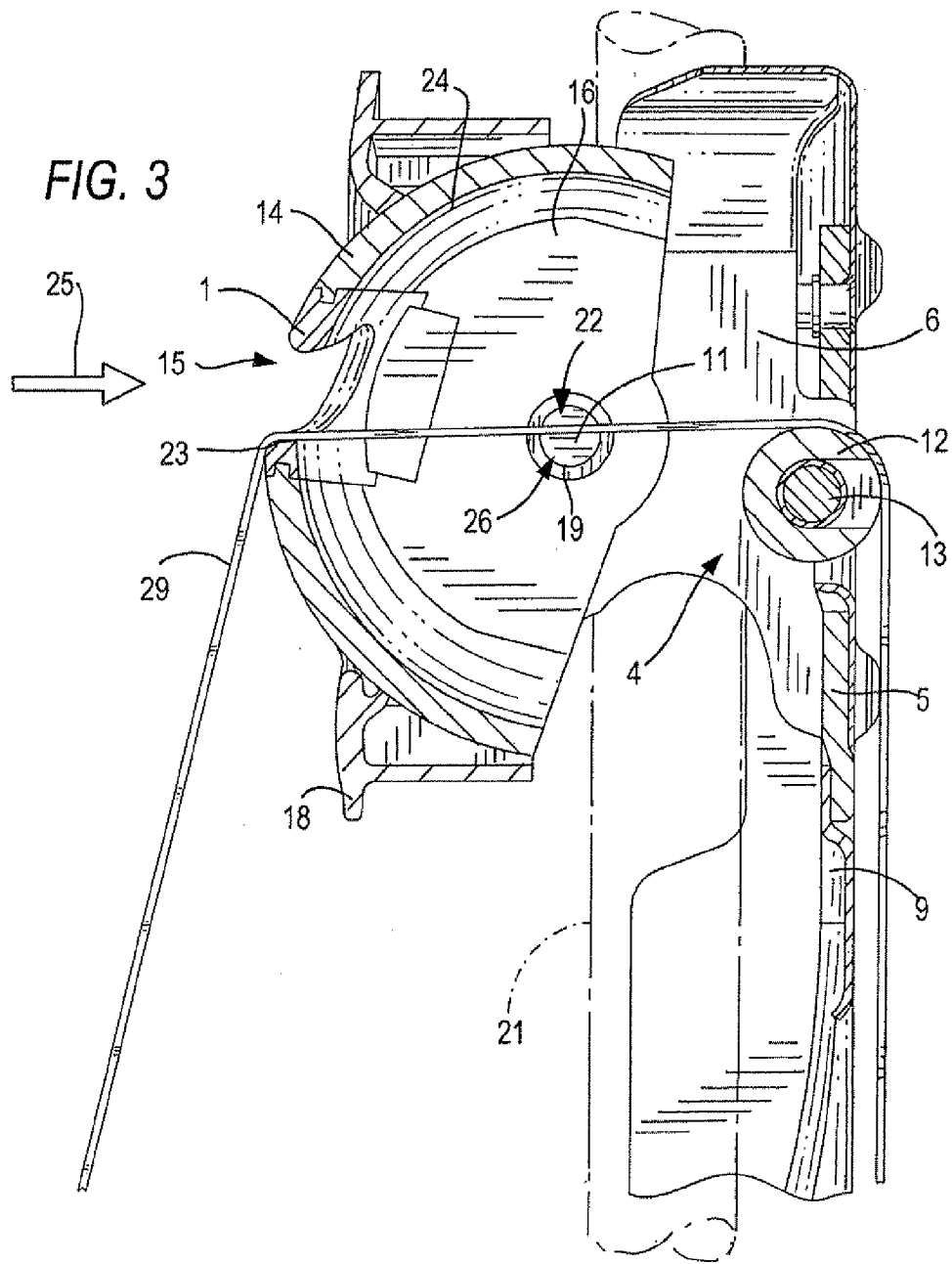

In FIG. 3, which shows a section through the deflection device according to the invention, the spatial arrangement of the swivel axle 11 is clearly visible vis-à-vis the spindle 13 and the outlet slot 15.

The swivel axle 11 in its locked position and the spindle 13 are parallel to one another. Unlike the state of the art, these two axles are formed spatially separate from one another, wherein the spindle 13 is arranged not only behind the swivel axle 11—seen from the outlet slot—but also slightly beneath it.

The outlet slot 15 is not parallel to the spindle 13, as it is formed in the frustum-shaped casing surface 14 of the housing. Although the central region 2 of the outlet slot 15 illustratively extends substantially horizontally (see FIGS. 4-6), the outlet slot 15 can be selectively rotated in a clockwise or counter-clockwise direction from its forward mounting position as shown in FIG. 8 towards the rear side of the vehicle seat, e.g., from which the belt closure is attached. Thus, a natural direction for the belt strap in the direction of the belt closure is achieved, which increases comfort of wear for the occupant.

In FIG. 3 the guiding of the belt strap 29 in the deflection device and following its emergence from the outlet slot 15 can be easily recognized.

In FIGS. 4 and 5 perspective views of the housing 24 are shown from two directions. The view of FIG. 4 serves to show the side face 16 with the second connecting means. 17, while FIG. 5 shows a virtually frontal view (relative to the mounting position), in which there has been a slight rotation towards the side face 16 with the opening 26.

Most features of the housing have already been discussed above: the rounded frustum-shaped casing surface 14, the forms of the bearing and locking features at the side faces 16 and the handle recesses 27. Regarding the handle recesses it must be added that these are formed such that the fingers (one each) of the occupant can fit well into them and find a good hold there, with the result that an error-free rotation of the housing 24 can take place ergonomically until the position of the outlet slot 15 and thus of the upper fastening point 23 desired by the occupant is reached.

Figure 6:
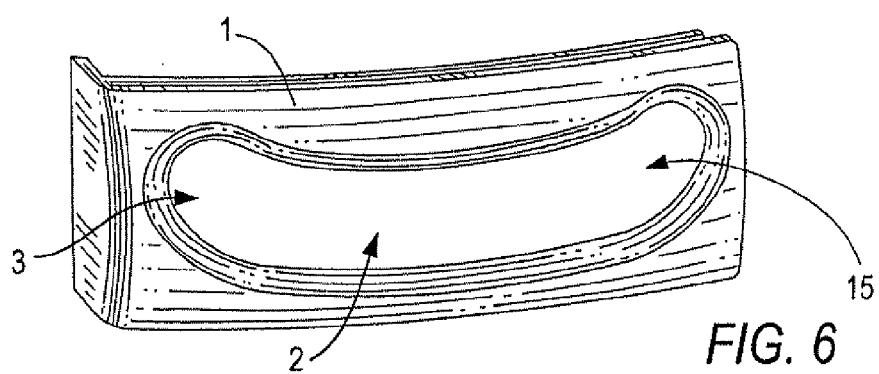

The region around the outlet slot 15 is formed as a separate, single-piece fitting 1, which can be detached from the housing 24. The fitting 1 can thus be easily replaced, as a result of which both design variety and an individual attention to the occupant's requirements are achieved. This fitting is shown in FIG. 6.

The horizontal central region 2 of the outlet slot 15 is defined by two upwardly bent edge regions 3. The outwardly bent design of the outlet slot 15, whose radii are optimized with a view to avoiding folds in the belt strap when being engaged, supports a reduction in friction (which is particularly noticeable during engagement) of the belt additionally to only the smallest friction because of the arrangement and design of the spindle 13 with reel 12. Moreover, when there is cooperation with the further geometry of the housing and the arrangement of the spindle 13 and of the swivel axle 11 all relevant entry and exit angles of the belt strap are realized without pivotable parts.

FIG. 8 differs from FIG. 3 only in that the height-adjustable deflection device is shown, not in sectional view, but in its lateral view. Therefore, only features additionally recognizable compared with FIG. 3 will be discussed below.

Second connecting means 17 are formed on the side face 16 of the housing 24 around the swivel axle 11 (pointing to the left in the representation). These second connecting means 17 are formed as a gear rim, the teeth of which are inclined clockwise. Part of the second connecting means 17 engages in form-locking manner with first connecting means 7. The first connecting means 7 are formed at the supporting bracket 6 of the holder 4. They are inverted vis-à-vis the second connecting means 17 over a predefined area.

In the shown position the second connecting means 17 engage in form-locking manner in the first connecting means 7, with the result that a rotation of the housing 24 about the swivel axle 11 is not possible. The swivel axle 11 is pushed to the left against the pressure 25 of the spring 10 (see FIGS. 1 and 2) against the direction shown by the double-arrow. Because of the design of the rows of teeth of the two connecting means 7, 17 and the possibility that the bearing facing the observer of the swivel axle 11 can extend to the right in the direction of view (see statements concerning FIGS. 1 and 2 with regard to the oblong hole 8 in which the swivel axle 11 is housed), the possibility exists that by applying force to the housing 24 by a clockwise rotation the rows of teeth can glide over one another and thus an upwards adjustment of the height of the outlet slot 15 can take place.

A rotation of the housing 24 in the opposite direction, thus anticlockwise, is on the other hand possible only if the rows of teeth of the two connecting means 7, 17 are disengaged. This takes place through a pressure 25 to the right against the force of the spring 10 (see FIGS. 1 and 2). If both rows of teeth are free, the height of the outlet slot 15 can be adjusted downwards by the occupant rotating the housing 24 anticlockwise. If the desired height of the outlet slot 15 is reached, the occupant releases the housing 24, with the result that there is no longer pressure 25 acting to the right on the spring 10. The swivel axle 11, and thus also the second connecting means 17, thereby moves back to the left and engage in form-locking manner with the first connecting means 7. In this position only a clockwise rotation of the housing 24 is again possible, as already described above. This mechanism can be compared with a ratchet mechanism.

In FIG. 7 a perspective view of a height-adjustable deflection device according to the invention on a backrest frame 21 is shown. The deflection device is fitted onto the supporting member 9 and the latter fixedly connected to the backrest frame 21.

When the vehicle seat is in its finished state upholstery runs underneath the panel 18, with the result that the deflection device and supporting member 9 and backrest frame 21 are not visible.

The outlet slot 15 is slightly rotated clockwise to the horizontal. Additionally it is inclined towards the swivel axle 11. The result is a belt guide which is well matched to the comfort requirements of the occupant.

In summary it can be said that the invention provides a deflection device which, compared with the conventional versions, is impressive due to its very compact structure, which in addition is very capable of being integrated within a vehicle seat and is completely enclosed, with the result that the risk of injury is virtually zero, and is virtually maintenance-free, as no dirt gets into it. In addition the deflection device according to the invention consists of only a few parts. In fact merely four components are necessary, namely a holder 4, a housing 24, a spring 10 arranged between them and a reel 12, as the housing 24 also serves as an actuating element at the same time. Moreover, the deflection device 3 according to the invention ensures good belt-retraction behaviour, as rolling friction predominantly arises instead of sliding friction. The deflection device according to the invention does not click and makes no other sounds, as it is a system in which the housing 24 is pressed in the holder 4 by means of the presprung swivel axle 11.

The invention claimed is:

1. A height-adjustable deflection device for an upper fastening point of a three-point belt with a holder which is configured for attachment to a supporting member of a vehicle seat or fixedly connected to a framework of a vehicle; wherein in the holder, a housing is movably attached which has a swivel axle and additionally a reel with a spindle is arranged, via which a belt strap of a three-point belt can be guided, and an outlet slot for receiving the belt strap includes a central region extending substantially horizontal with respect to the spindle of the reel; and wherein a first connecting means is formed at the holder and a second connecting means is provided on the housing and which engage in a form-locking manner with one another in a locked position, and are disengaged with one another in an adjustment position such that the housing is rotatable about the swivel axle, and wherein the spindle of the housing is pressed into the locked position by means of a spring, and the holder has a connecting plate and two supporting brackets, in each of which an oblong hole and a bearing hole is formed to receive the housing of the deflection device, and the spindle is arranged parallel to and with respect to the outlet slot, behind the swivel axle.

2. The height-adjustable deflection device according to claim 1, characterized in that the first connecting means and the second connecting means are each gear tooth systems matched to one another.

3. The height-adjustable deflection device according to claim 2, characterized in that the gear tooth system is configured as a ratchet mechanism to selectively enable unidirectional and bidirectional rotation of the housing about the swivel axle.

4. The height-adjustable deflection device according to claim 1, characterized in that the first and second connecting means are formed only on one side of the deflection device.

5. The height-adjustable deflection device according to claim 1, characterized in that, the swivel axle is formed by a fixed first bearing mounted along a first support bracket of the holder, and a floating second bearing mounted along a second support bracket of the holder.

6. The height-adjustable deflection device according to claim 1, characterized in that the swivel axle is formed in one piece with the housing at least at one bearing point.

7. The height-adjustable deflection device according to claim 1, wherein the swivel axle includes opposing ends and in which at least one of the opposing ends has a form lock in which a free end of the spring is guided.

8. The height-adjustable deflection device according to claim 1, characterized in that the spring is formed as a spiral spring.

9. The height-adjustable deflection device according to claim 1, characterized in that the outlet slot and the spindle in its central region both run horizontally and the outlet slot is bent upwards in both its edge regions.

10. The height-adjustable deflection device according to claim 1, characterized in that the reel is formed convex.

11. The height-adjustable deflection device according to claim 1, characterized in that the reel includes bearings that are crowned.

12. The height-adjustable deflection device according to claim 1, characterized in that the region around the outlet slot is formed as a fitting which can be detached from the housing.

13. The height-adjustable deflection device according to claim 1, characterized in that the housing has a substantially frustum-shaped casing surface, formed concentrically about the swivel axle.

14. The height-adjustable deflection device according to claim 13, characterized in that the housing includes handle recesses for selectively rotating the housing.

15. Vehicle seat with a three-point belt which has a height-adjustable deflection device according to claim 1.

16. The vehicle seat with a three-point belt which has a height adjustable deflection device according to claim 15, characterized in that the housing is partly covered by a panel.

17. Method for providing height adjustment of an upper fastening point of a three-point belt by means of a height-adjustable deflection device according to claim 1, in which the housing is rotated in a first direction while being pressed backwards against a pressure, the housing being rotated about the spindle and is then released again, and upon rotation in an opposite, second direction, the housing is uni-directionally rotatable corresponding to a ratchet mechanism.

\* \* \* \* \*